United States Patent [19]

Foster

[11] Patent Number: 4,812,375

[45] Date of Patent: Mar. 14, 1989

[54] SEPARATOR FOR LITHIUM BATTERIES AND LITHIUM BATTERIES INCLUDING THE SEPARATOR

[75] Inventor: Donald L. Foster, Eatontown, N.J.

[73] Assignee: The United States of America as represented by the Secretary of the Army, Washington, D.C.

[21] Appl. No.: 213,031

[22] Filed: Jun. 27, 1988

[51] Int. Cl.⁴ .............................................. H01M 2/16
[52] U.S. Cl. ................................... 429/101; 429/144; 429/216
[58] Field of Search ............... 429/144, 145, 216, 248, 429/101

[56] References Cited

U.S. PATENT DOCUMENTS

| | | |
|---|---|---|
| 3,451,851 | 6/1969 | Stanimirovitch .................... 429/216 |
| 3,980,497 | 9/1976 | Gillman et al. ..................... 429/145 |
| 4,124,743 | 11/1978 | Chireau et al. ..................... 429/144 |
| 4,273,840 | 6/1981 | Machi et al. ......................... 429/144 |
| 4,762,758 | 8/1988 | Shuster et al. ...................... 429/144 |

*Primary Examiner*—Donald L. Walton
*Attorney, Agent, or Firm*—Sheldon Kanars; Roy E. Gordon

[57] ABSTRACT

A multilayer separator is provided for insertion between the cathode and anode in lithium secondary or primary batteries, the separator including porous membrane and an electroactive polymeric material contained within the separator layers wherein the polymer is one that will react with any lithium dendrite that could penetrate the separator thus preventing an internal short circuit of the cell.

21 Claims, No Drawings

SEPARATOR FOR LITHIUM BATTERIES AND LITHIUM BATTERIES INCLUDING THE SEPARATOR

The invention described herein may be manufactured, used, and licensed by or for the Government for governmental purposes without the payment to me of any royalty thereon.

This invention relates in general to separators for lithium batteries and in particular to a novel finely porous or solvent swellable membrane that acts as a separator between the cathode and anode in lithium secondary or primary batteries.

BACKGROUND OF THE INVENTION

One of the primary problems that has limited development of rechargeable batteries has been the formation of dendrite lithium on the negative electrode. This has led to two difficulties:

(a) Low cycling efficiency has resulted from lithium dendrite becoming electrically isolated and high corrosion rate due to high surface area of the lithium dendrites.

(b) Lithium dendrites have grown through the separator causing an internal short circuit. The resulting high currents have heated the battery to the point that the highly reactive lithium reacts explosively with the electrolyte and cathode materials. This safety hazard has been a serious drawback of rechargeable lithium batteries and even some primary lithium systems where lithium dendrites form on overcharge.

The development of rechargeable lithium batteries such as Li/LiAlCl$_4$—3SO$_2$/C or rechargeable cells such as Li/TiS$_2$ organic solvents and salts such as LiBr or LiI has at least in principle minimized the lithium cycling efficiency problem. Soluble overcharge products formed at the positive electrode have reacted with the dendrites to reform the electrolyte salt which has gone back into solution. Therefore, by sufficiently overcharging the cell, it should be possible to retrieve isolated lithium dendrites and in some cases lithium corrosion products such that no anode material is lost during repeated cycling. Unfortunately, reaction of overcharge products with lithium dendrites has usually not been rapid enough to prevent cell shorting. Furthermore, even the development of finely porous, microporous and solvent swellable membranes for lithium secondary cells has not been able to completely eliminate the internal shorting problem.

SUMMARY OF THE INVENTION

The general object of this invention is to provide a separator between the cathode and anode in lithium secondary or primary batteries that will eliminate internal shorting. A more specific object is to provide a separator material that will react with any lithium dendrite that could penetrate the separator thus preventing an internal short circuit of the battery.

It has now been found that the aforementioned objects can be attained by providing a multilayer separator including porous membrane and an electroactive polymeric material contained within the separator layers wherein the polymer is one that will react with any lithium dendrite that tries to penetrate the separator thus preventing an internal short circuit of the cell. Such a polymer could be polyvinylpyridine, poly-3 methylthiophene, polythiophene, polypyrrole or polyaniline.

The invention includes a composite separator including a finely porous separator, microporous separator, or solvent swellable membrane. The inner layer of separator or the inside face of a two layer composite separator contains a very thin layer of polymer.

Thin coatings of polyvinylpyridine can be made by dissolving the polymer in a volatile solvent such as toluene and dipcoating the membrane with polymer and drying. If the polymer is soluble in the electrolyte chosen for the cell, the polymer can be crosslinked by treating the thinly coated membrane with dichlorobenzene, dibromobenzene or diiodobenzene.

Polymers that can be electrodeposited, such as poly-3 methylthiophene can be used by first sputtering a thin layer of metal on the separator surface. Then, a very thin layer of polymer can be electrodeposited on the metallized surface.

DESCRIPTION OF THE PREFERRED EMBODIMENT

An electrochemical cell is made by electrodepositing a 2.0 micron layer of poly-3 methylthiophene on the end of a thin platinum rod. The electrode is then placed in a flask containing LiAlCl$_4$—3SO$_2$ electrolyte and lithium reference and counter electrodes. Cyclic voltammetry experiments are carried out over the 3.7 V–2.0 V potential range. The results show that SO$_2$ is effectively reduced on the polymer and that the discharge product on the polymer is essentially the same as on the bare carbon cathode. This embodiment shows that thin layers of polymer on a porous separator as described, are reduced when shorted by a lithium dendrite. Further, since the discharge product is the same as that formed in a standard cell with carbon cathodes, the polymer electrode is reoxidized by cell overcharge products, as is found to occur at cathodes of Li/LiAlCl$_4$-3SO$_2$/C cells.

I wish it to be understood that I do not desire to be limited to the exact details as described for obvious modifications will occur to a person skilled in the art.

What is claimed is:

1. A multilayer separator for preventing the internal shorting of lithium batteries, said multilayer separator including porous membranes and an electroactive polymeric material contained within the separator layers wherein the polymer is one that will react with any lithium dendrites that could penetrate the separator thus preventing an internal short circuit of the cell.

2. A separator according to claim 1 wherein the polymer is selected from the group consisting of polyvinylpyridine, poly-3 methylthiophene, polythiophene, polypyrrole and polyaniline.

3. A separator according to claim 2 wherein the polymer is polyvinylpyridine.

4. A separator according to claim 2 wherein the polymer is poly-3 methylthiophene.

5. A separator according to claim 2 wherein the polymer is polythiophene.

6. A separator according to claim 2 wherein the polymer is polypyrrole.

7. A separator according to claim 2 wherein the polymer is polyaniline.

8. A separator according to claim 1 wherein the polymer is deposited in the pores by dissolving the polymer in a volatile solvent, dipcoting the membrane with the polymer solution and drying.

9. A separator according to claim 1 wherein the polymer coating is crosslinked by treating the thinly coated membrane with a member of the group consisting of dichlorobenzene, dibromobenzene or diiodobenzene.

10. A separator according to claim 1 wherein the polymer is electrodeposited into the separator by first sputtering a thin layer of metal on the separator surface and then electrodepositing a very thin layer of polymer on the metallized surface.

11. A lithium battery including lithium as the anode, a cathode spaced from said anode, said anode and cathode being immersed in an electrolyte that circulates through said anode and cathode, and a multilayer separator between the anode and cathode, said multilayer separator including porous membranes and an electroactive polymeric material contained within the separator layers wherein the polymer is one that will react with any lithium dendrite that could penetrate the separator thus preventing an internal short circuit of the battery.

12. A lithium battery according to claim 11 wherein the polymer is selected from the group consisting of polyvinylpyridine, poly-3 methylthiophene, polythiophene, polypyrrole and polyaniline.

13. A lithium battery according to claim 12 wherein the polymer is polyvinylpyridine.

14. A lithium battery according to claim 12 wherein the polymer is poly-3 methylthiophene.

15. A lithium battery according to claim 12 wherein the polymer is polythiophene.

16. A lithium battery according to claim 12 wherein the polymer is polypyrrole.

17. A lithium battery according to claim 12 wherein the polymer is polyaniline.

18. A lithium battery according to claim 11 wherein the polymer is deposited in the pores by dissolving the polymer in a volatile solvent, dipcoating the membrane with the polymer solution and drying.

19. A lithium battery according to claim 11 wherein the polymer coating is crosslinked by treating the thinly coated membrane with a member of the group consisting of dichlorobenzene, dibromobenzene and diiodobenzene.

20. A lithium battery according to claim 11 wherein the polymer is electrodeposited into the separator by first sputtering a thin layer of metal on the separator surface and then electrodepositing a very thin layer of polymer on the metallized surface.

21. A lithium battery including lithium as the anode, a carbon cathode spaced from the anode, said anode and cathode being immersed in an electrolyte of lithium tetrachloroaluminate in liquid sulfur dioxide that circulates through said anode and cathode, and a separator between the anode and cathode, said separator including a thin coating of metal onto which has been electrodeposited an 2.0 micron layer of poly 3 methylthiophene.

* * * * *